(12) United States Patent
Yu et al.

(10) Patent No.: US 12,491,944 B2
(45) Date of Patent: Dec. 9, 2025

(54) VEHICLE ROOF ASSEMBLY AND METHOD FOR MANUFACTURING THE SAME

(71) Applicants: Hyundai Motor Company, Seoul (KR); Kia Corporation, Seoul (KR); KOLON SPACEWORKS CO., LTD., Geyongsangnam-do (KR)

(72) Inventors: Kyung Min Yu, Seoul (KR); Dong Won Kim, Gimpo-si (KR); Chang Hun Lee, Incheon (KR); Min Jun Kim, Gimpo-si (KR); Young Ju Kim, Seoul (KR); Hyun Chul Lee, Siheung-si (KR)

(73) Assignees: HYUNDAI MOTOR COMPANY, Seoul (KR); KIA CORPORATION, Seoul (KR); KOLON SPACEWORKS CO., LTD., Gyeongsangnam-Do (KR)

( * ) Notice: Subject to any disclaimer, the term of this patent is extended or adjusted under 35 U.S.C. 154(b) by 387 days.

(21) Appl. No.: 18/187,478

(22) Filed: Mar. 21, 2023

(65) Prior Publication Data
US 2024/0075988 A1    Mar. 7, 2024

(30) Foreign Application Priority Data
Sep. 7, 2022    (KR) .................. 10-2022-0113772

(51) Int. Cl.
| | | |
|---|---|---|
| B62D 25/06 | (2006.01) | |
| B32B 3/00 | (2006.01) | |
| B32B 3/04 | (2006.01) | |
| B62D 29/04 | (2006.01) | |

(52) U.S. Cl.
CPC .............. *B62D 25/06* (2013.01); *B32B 3/04* (2013.01); *B62D 29/048* (2013.01)

(58) Field of Classification Search
CPC .... B62D 25/06; B62D 29/043; B62D 29/048; B32B 3/12; B60R 13/06; B60J 10/45
USPC ................... 296/210, 191, 901.01
See application file for complete search history.

(56) References Cited

U.S. PATENT DOCUMENTS

| | | | | |
|---|---|---|---|---|
| 8,418,962 | B2* | 4/2013 | Piehl | B64C 7/00 |
| | | | | 244/123.13 |
| 12,312,014 | B2* | 5/2025 | Foran | B32B 3/28 |
| 2011/0226312 | A1* | 9/2011 | Bohm | H10F 19/80 |
| | | | | 136/251 |
| 2015/0130105 | A1* | 5/2015 | Preisler | B29C 43/18 |
| | | | | 264/258 |
| 2019/0283361 | A1* | 9/2019 | Jia | B32B 5/024 |

FOREIGN PATENT DOCUMENTS

GB    1560858    *    2/1980

* cited by examiner

*Primary Examiner* — Dennis H Pedder
(74) *Attorney, Agent, or Firm* — SLATER MATSIL, LLP

(57) ABSTRACT

An embodiment roof assembly for a vehicle includes a roof panel including a core, an upper skin attached to a top surface of the core, and a lower skin attached to a bottom surface of the core, a face sheet disposed above the roof panel, and a foam layer interposed between the roof panel and the face sheet.

18 Claims, 15 Drawing Sheets

VEHICLE ROOF ASSEMBLY AND METHOD FOR MANUFACTURING THE SAME

CROSS-REFERENCE TO RELATED APPLICATIONS

This application claims the benefit of Korean Patent Application No. 10-2022-0113772, filed on Sep. 7, 2022, which application is hereby incorporated herein by reference.

TECHNICAL FIELD

The present disclosure relates to a vehicle roof assembly.

BACKGROUND

A vehicle includes a roof system covering the top of a passenger compartment, and the roof system includes a plurality of roof rails extending in a width direction of the vehicle and a roof panel supported by the plurality of roof rails.

It is required to make various vehicle components lightweight. As for a material of the roof panel, a steel material is replaced with a composite material.

Some vehicles have roof panels made of thermoset composites. However, thermoset composites have relatively low impact resistance and are not recyclable.

The above information described in this background section is provided to assist in understanding the background of the inventive concept, and may include any technical concept which is not considered as the prior art that is already known to those skilled in the art.

SUMMARY

The present disclosure relates to a vehicle roof assembly. Particular embodiments relate to a vehicle roof assembly and a method for manufacturing the same designed to reduce the weight of the roof assembly and improve strength and stiffness thereof.

Embodiments of the present disclosure can solve problems occurring in the prior art while advantages achieved by the prior art are maintained intact.

An embodiment of the present disclosure provides a vehicle roof assembly and a method for manufacturing the same designed to relatively reduce the weight of the roof assembly and significantly improve strength, stiffness, and impact resistance thereof.

According to an embodiment of the present disclosure, a vehicle roof assembly may include a roof panel including a core, an upper skin attached to a top surface of the core, and a lower skin attached to a bottom surface of the core, a face sheet disposed above the roof panel, and a foam layer interposed between the roof panel and the face sheet.

The face sheet may cover end surfaces of edges of the roof panel and a top surface of the roof panel.

The face sheet may include a cover portion covering an end surface of the roof panel, and the foam layer may include an extension portion interposed between the cover portion and the end surface of the roof panel.

The extension portion of the foam layer may have a recess spaced apart from a vehicle body by a predetermined distance.

The vehicle roof assembly may further include a seal strip mounted on an edge of the roof panel. The seal strip may include a first attachment portion attached to the end surface of the roof panel, a second attachment portion attached to a bottom surface of the roof panel, and a seal lip contacting a vehicle body. The edge of the roof panel may be fixed to the vehicle body through an adhesive layer.

The first attachment portion may be at least partially embedded into the extension portion, and the second attachment portion may at least partially overlap the adhesive layer.

The vehicle roof assembly may further include a mounting hardware fixed to the roof panel, and the roof panel may include a mounting surface to which the mounting hardware is fixed.

The roof panel may have a mounting recess recessed from the mounting surface toward a top surface of the roof panel. The mounting hardware may include a stud, a shank extending from the stud toward the roof panel, and a head provided on a top end of the shank. The head and the shank may be inserted into the mounting recess and may be fixed to the mounting recess through an adhesive layer.

The mounting hardware may further include a mounting flange provided on a top end of the stud, and the mounting flange may be fixed to the mounting surface of the roof panel through an adhesive.

The roof panel may further include a draft surface inclined with respect to the mounting surface at a predetermined angle.

The core may include thermoplastic, and each of the upper skin and the lower skin may include a reinforcing fiber and a thermoplastic resin.

According to another embodiment of the present disclosure, a method for manufacturing a vehicle roof assembly may include forming a roof panel by fixing an upper skin to a top surface of a core and fixing a lower skin to a bottom surface of the core, forming a face sheet through vacuum forming, and fixing the roof panel to the face sheet through formation of a foam layer.

The forming of the roof panel may include fixing the upper skin and the lower skin to the top surface and the bottom surface of the core through heat fusion, respectively, heating the roof panel to soften the roof panel, and pressing the roof panel to form the roof panel into a final shape.

The method may further include attaching a seal strip to an edge of the roof panel.

The fixing of the roof panel to the face sheet may include inserting the face sheet into a cavity of a mold, forming the foam layer by applying a foamable material to the face sheet by an applicator, and pressing the roof panel, the foam layer, and the face sheet after the roof panel is located on the foam layer.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
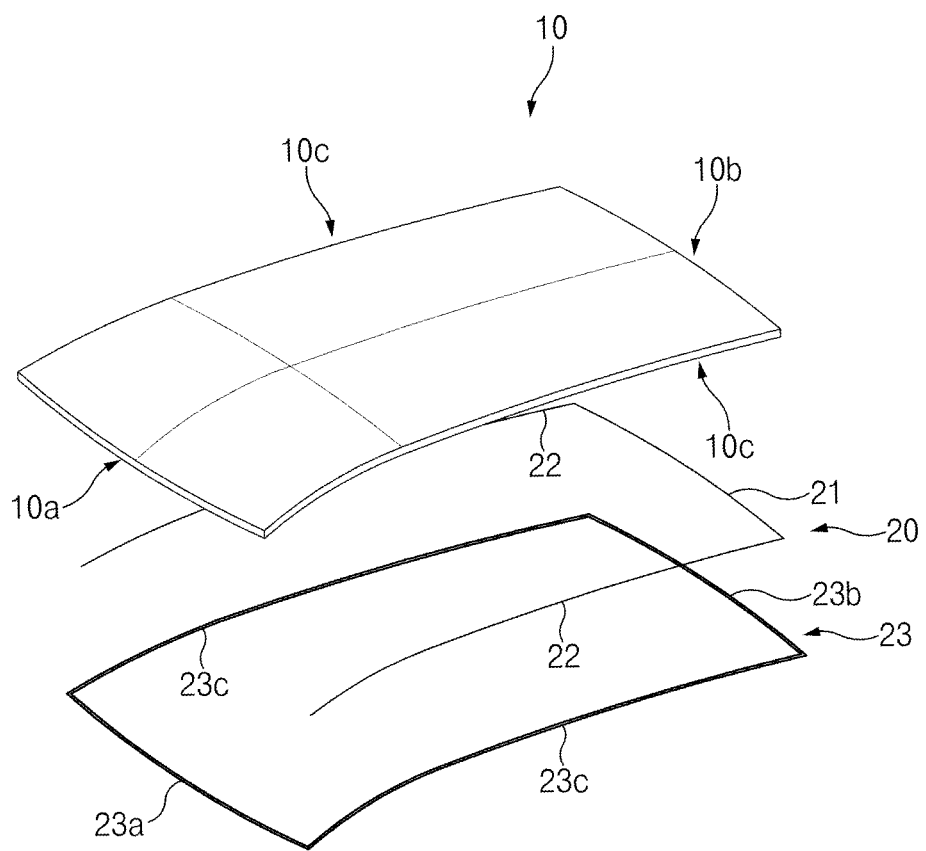
FIG. 1 illustrates an exploded perspective view of a vehicle roof assembly according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of aft, and are not to be interpreted as having ideal or excessively formal meanings unless clearly defined as having such in the present application.

Figure 2:
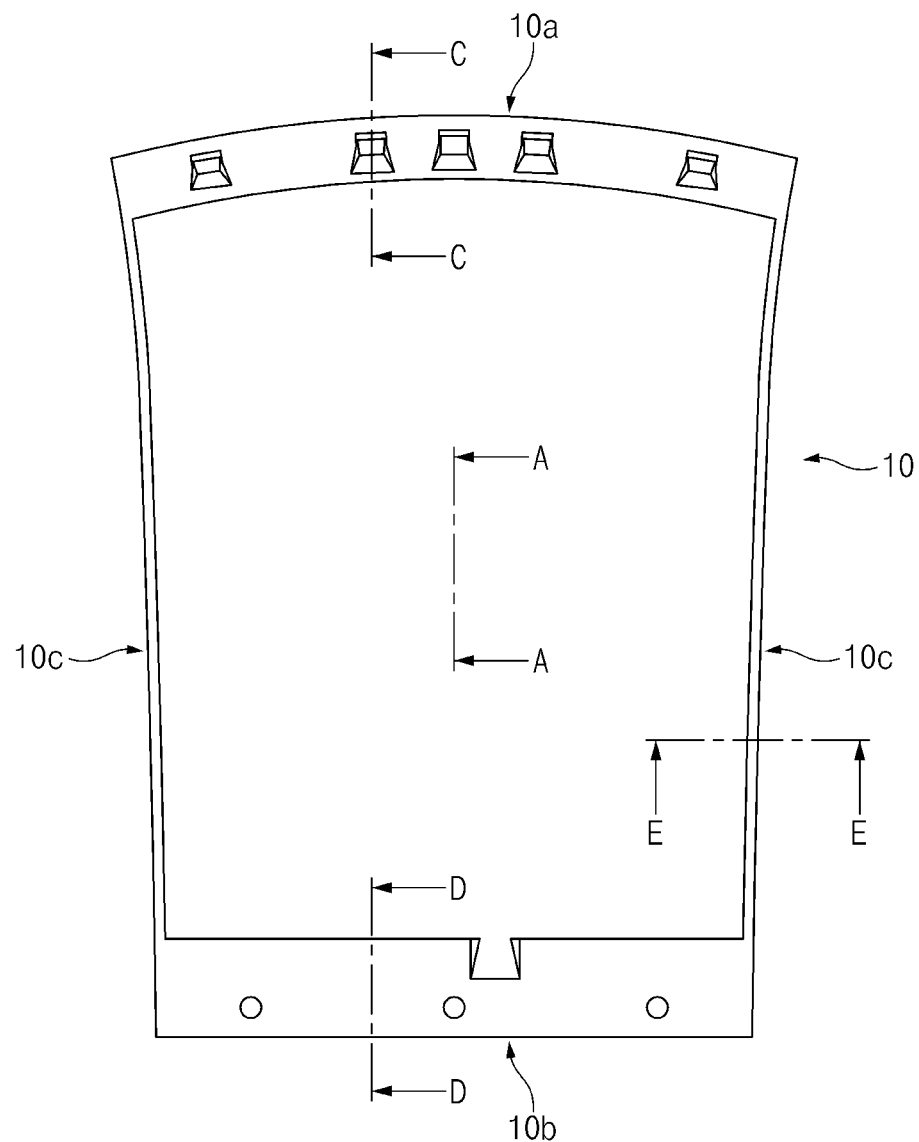
FIG. 2 illustrates a bottom view of a vehicle roof assembly according to an exemplary embodiment of the present disclosure.

Referring to FIGS. 1 and 2, a vehicle roof assembly 10 according to an exemplary embodiment of the present disclosure may include a front edge ma facing the front of the vehicle, a rear edge 10b facing the rear of the vehicle, and a pair of lateral edges 10c facing the sides of the vehicle.

Referring to FIG. 1, the vehicle roof assembly 10 may include a seal strip 20 mounted on at least one of the edges thereof. The seal strip 20 may include a rear seal strip 21 mounted on the rear edge 10b, and a pair of lateral seal strips 22 mounted on the pair of lateral edges Doc, respectively. The rear seal strip 21 may extend along the rear edge 10b of the vehicle roof assembly 10 so that the rear seal strip 21 may provide sealing between the rear edge 10b of the vehicle roof assembly 10 and a vehicle body, and each lateral seal strip 22 may extend along the corresponding lateral edge 10c of the vehicle roof assembly 10 so that the lateral seal strip 22 may provide sealing between the corresponding lateral edge 10c of the vehicle roof assembly 10 and the vehicle body. The pair of lateral seal strips 22 may be integrally connected to the rear seal strip 21 so that the seal strip 20 may form a unitary one-piece structure having the pair of lateral seal strips 22 and the rear seal strip 21.

The vehicle roof assembly 10 may be fixed to the vehicle body through an adhesive layer 23. After a liquid adhesive material is applied to the vehicle body, the vehicle roof assembly 10 may press the applied liquid adhesive material while the liquid adhesive material is cured so that the adhesive layer 23 may be formed. The adhesive layer 23 may include a front adhesive layer 23a fixing the front edge boa of the vehicle roof assembly 10 to the vehicle body, a rear adhesive layer 23b fixing the rear edge bob of the vehicle roof assembly 10 to the vehicle body, and a pair of lateral adhesive layers 23c fixing the lateral edges 10c of the vehicle roof assembly 10 to the vehicle body, respectively. The front adhesive layer 23a, the pair of lateral adhesive layers 23c, and the rear adhesive layer 23b may be connected to each other so that the adhesive layer 23 may form a continuous frame along the edges of the vehicle roof assembly 10.

Figure 3:
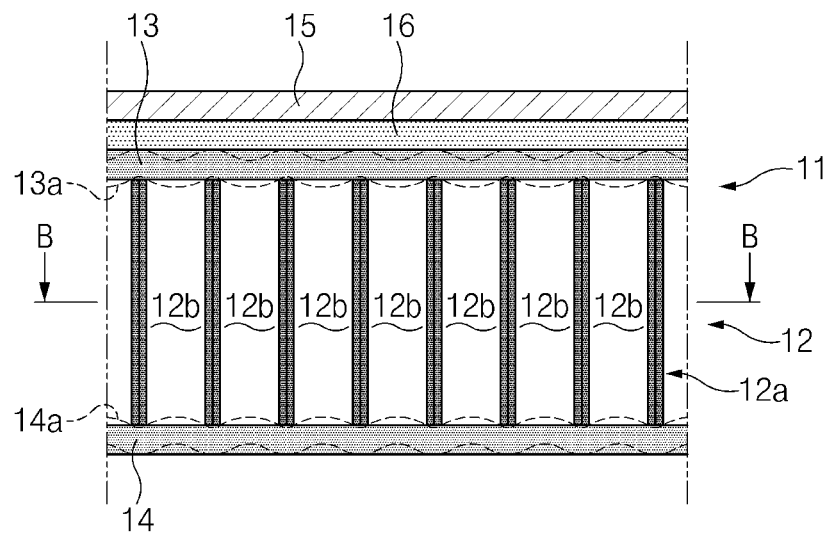
FIG. 3 illustrates a cross-sectional view, taken along line A-A of FIG. 2.

Referring to FIG. 3, the vehicle roof assembly 10 may include a roof panel 11, a face sheet 15 located above the roof panel 11, and a foam layer 16 interposed between the roof panel 11 and the face sheet 15.

The roof panel 11 may include a front edge facing the front of the vehicle, a rear edge facing the rear of the vehicle, and a pair of lateral edges facing the sides of the vehicle. The roof panel 11 may include a core 12, an upper skin 13 attached to a top surface of the core 12, and a lower skin 14 attached to a bottom surface of the core 12.

According to an exemplary embodiment of the present disclosure, the roof panel 11 may include thermoplastic composites, and accordingly the weight of the roof panel 11 may be significantly reduced, impact resistance and stiffness of the roof panel 11 may be improved, and recycling thereof may be facilitated. In particular, since the stiffness of the roof panel 11 itself is improved, the number of roof rails for improving stiffness of a vehicle roof system may be reduced, and thus the weight reduction of the vehicle roof system may be maximized.

The core 12 may be a honeycomb core in which a plurality of core cells 12a are continuously formed, and each core cell 12a may have a cavity 12b defined therein. Each core cell 12a may have a hexagonal cross section. Otherwise, each core cell 12a may have a circular cross section or a rectangular cross section.

The core 12 may be made of thermoplastic. For example, thermoplastic may be at least one material selected from the group consisting of polycarbonate (PC), polypropylene (PP), polyamide (PA), and polyurethane (PU).

The density of the core 12, the wall thickness of each core cell, the size of each core cell, and the like may be important factors in determining the weight reduction of the roof panel 11.

According to an exemplary embodiment, the density of the core 12 may be 50-150 kg/m³, and the weight percent (wt %) of the core 12 may be appropriately determined by comparing with the weight percent (wt %) of the skins 13 and 14 considering the total weight of the roof panel 11.

According to an exemplary embodiment, a wall thickness ti of each core cell 12a of the core 12 may be 0.2-1.5 mm, and the wall thickness ti of each core cell 12a may be determined based on the weight and performance of the roof panel 11.

Figure 4:
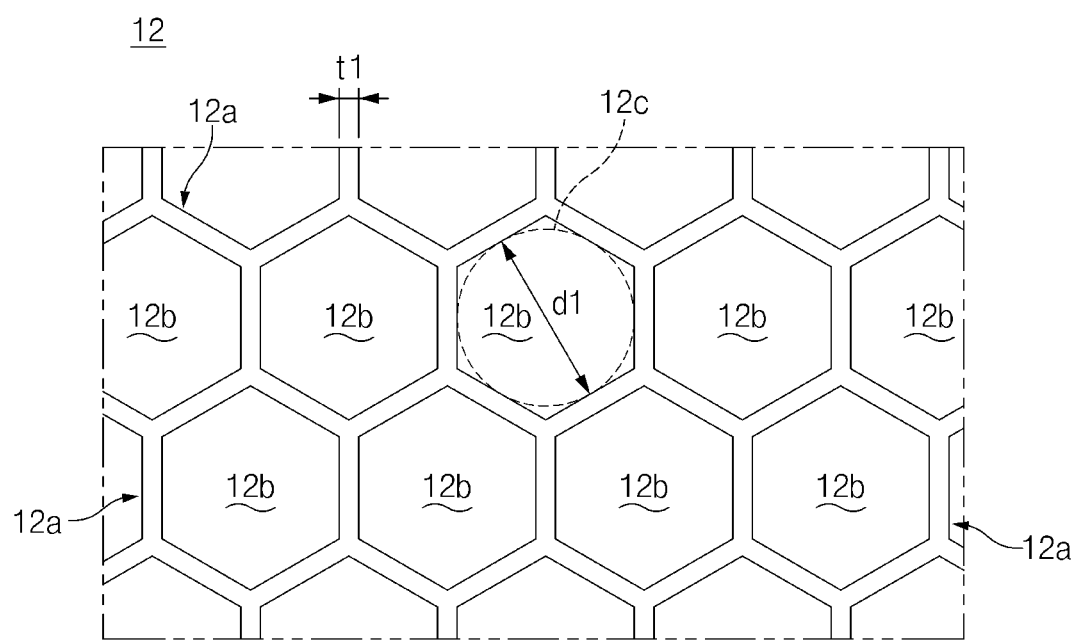
FIG. 4 illustrates a cross-sectional view, taken along line B-B of FIG. 3.

According to an exemplary embodiment, a size d1 of each core cell 12a may be 4-12 π (pi), and the size d1 of each core cell 12a may be determined based on the weight and performance of the roof panel 11. Referring to FIG. 4, the size d1 of the core cell 12a may be equal to a diameter of its inscribed circle 12C.

The upper skin 13 and the lower skin 14 may be made of thermoplastic composites such as continuous fiber composites and uni-direction (UD) tape. According to a specific exemplary embodiment, the upper skin 13 and the lower skin 14 may be made of thermoplastic composites including a reinforcing fiber and a thermoplastic resin. For example, the reinforcing fiber may be at least one of carbon fiber, glass fiber, and aramid fiber. For example, the thermoplastic resin may be at least one material selected from the group consisting of polycarbonate (PC), polypropylene (PP), polyamide (PA), and polyurethane (PU).

The thickness of each of the skins 13 and 14, the density of the reinforcing fiber, the content of the reinforcing fiber, and the like may be important factors in determining the weight reduction of the roof panel 11.

According to an exemplary embodiment, the thickness of each of the skins 13 and 14 may be 0.2-1 mm. The thickness of each of the skins 13 and 14 may be determined based on the total thickness and performance of the roof panel 11.

According to an exemplary embodiment, the density of the reinforcing fiber in each of the skins 13 and 14 may be 1200-1800 kg/m3.

According to an exemplary embodiment, the content of the reinforcing fiber in each of the skins 13 and 14 may be 30-70 wt %.

According to an exemplary embodiment, the content of the thermoplastic resin in each of the skins 13 and 14 may be 30-70 wt %.

According to an exemplary embodiment, the upper skin 13 and the lower skin 14 may be fixed to the core 12 through heat fusion. As the upper skin 13 and the lower skin 14 are fixed to the core 12 through heat fusion, they may be integrated without any interface at a joint portion between the core 12 and the upper skin 13 and a joint portion between the core 12 and the lower skin 14 so that the upper skin 13 and the lower skin 14 may be firmly fixed to the core 12. The upper skin 13 may be fixed to the top surface of the core 12 through heat fusion, and the lower skin 14 may be fixed to the bottom surface of the core 12 through heat fusion so that the upper skin 13 and the lower skin 14 may have the core 12 sandwiched therebetween. Accordingly, the roof panel 11 may be a sandwich panel including thermoplastic composites. As the roof panel 11 is formed of the sandwich panel including thermoplastic composites, it may have high section modulus, thereby having very excellent strength and stiffness relative to its weight. Accordingly, even if a reinforcing member is not used, impact resistance, strength, and stiffness of the roof panel 11 may be sufficiently secured, and the weight reduction of the roof panel 11 may be effectively achieved.

After an initial shape of the roof panel 11 is formed by heat fusion, the roof panel 11 may be formed into a final shape through thermoforming. As the roof panel 11 is thermoformed, various forming portions such as a recess and a projection may be formed in/on the top surface and/or bottom surface of the roof panel 11. In particular, as the roof panel 11 is made of the thermoplastic composites, the thermoforming of the roof panel 11 may be performed more accurately.

When the upper skin 13 and the lower skin 14 are fixed to the core 12 through heat fusion, the upper skin 13 may be recessed into the cavity 12b of the core cell 12a so that the upper skin 13 may have a sink mark (see a dotted line 13a of FIG. 3), and the lower skin 14 may be recessed into the cavity 12b of the core cell 12a so that the lower skin 14 may have a sink mark (see a dotted line 14a of FIG. 3). That is, when the upper skin 13 and the lower skin 14 are fixed to the core 12 through heat fusion, the upper skin 13 and the lower skin 14 may have the sink mark formed by a telegraphing effect, which may degrade the exterior quality of the roof panel 11. The lower skin 14 of the roof panel 11 may be covered with a headliner, an interior trim, and the like so that the sink mark of the lower skin 14 may not be exposed to the interior of the vehicle, and accordingly the lower skin 14 of the roof panel 11 may satisfy its exterior quality standard. On the other hand, the upper skin 13 of the roof panel 11 may be exposed to the exterior of the vehicle. When the face sheet is directly attached to the upper skin 13 or paint is directly applied to the upper skin 13, the face sheet or the paint may have curves in response to the sink mark of the upper skin 13, which may degrade the exterior quality of the vehicle.

Referring to FIG. 3, the vehicle roof assembly 10 according to an exemplary embodiment of the present disclosure may include the face sheet 15 entirely covering a top surface of the upper skin 13 of the roof panel 11, and the foam layer 16 interposed between the upper skin 13 of the roof panel 11 and the face sheet 15.

The face sheet 15 may cover end surfaces of the edges of the roof panel 11 and the top surface of the roof panel 11 so that the face sheet 15 may prevent the top surface of the roof panel 11 from being exposed to the exterior of the vehicle, and thus the exterior quality of the roof panel 11 may be improved.

The face sheet 15 may include a thermoplastic resin. For example, the thermoplastic resin may be at least one material selected from the group consisting of polycarbonate (PC), acrylonitrile butadiene-styrene (ABS) copolymer, and polymethyl methacrylate (PMMA).

A foamable material may be applied between the face sheet 15 and the upper skin 13 of the roof panel 11 by an applicator, and the applied foamable material may be foamed and cured to form the foam layer 16 between the face sheet 15 and the upper skin 13 of the roof panel 11. For example, the foamable material may be at least one material selected from the group consisting of polyurethane (PU), polystyrene (PS), polyethylene (PE), polypropylene (PP), and polyvinyl chloride (PVC).

The foamable material may be foamed and cured between the face sheet 15 and the upper skin 13 of the roof panel 11 so that the foam layer 16 may join the face sheet 15 and the roof panel 11, and a thickness of a gap between the face sheet 15 and the roof panel 11 may be kept constant. As the foam layer 16 entirely covers the top surface of the upper skin 13 of the roof panel 11, it may prevent the upper skin 13 of the roof panel 11 from being exposed, and when the foamable material is cured, it may firmly join the face sheet 15 and the roof panel 11.

As the face sheet 15 and the foam layer 16 cover the top surface of the roof panel 11 and the end surfaces of the edges of the roof panel 11, the exterior quality of the vehicle roof assembly 10 may be improved.

The roof panel 11 may include a front end surface 11a (see FIG. 5) facing the front of the vehicle, a rear end surface 11b (see FIG. 6) facing the rear of the vehicle, and a pair of lateral end surfaces 11c (see FIG. 7) facing the sides of the vehicle. The front end surface 11a may extend along the front edge of the roof panel 11, and the rear end surface 11b may extend along the rear edge of the roof panel 11. Each lateral end surface 11c may extend along the corresponding lateral edge of the roof panel 11.

The roof panel 11 may include a front-side bottom surface 11f adjacent to the front end surface 11a, a rear-side bottom surface ng adjacent to the rear end surface 11b, and a pair of lateral-side bottom surfaces 11h adjacent to the pair of lateral end surfaces 11c.

The face sheet 15 may include a cover portion covering the end surface of the roof panel 11, and the foam layer 16 may include an extension portion interposed between the cover portion and the end surface of the roof panel 11.

The face sheet 15 may include a front cover portion 15a covering the front end surface 11a of the roof panel 11, a rear cover portion 15b covering the rear end surface 11b of the roof panel 11, and a pair of lateral cover portions 15c covering the pair of lateral end surfaces 11c of the roof panel 11.

Figure 5:
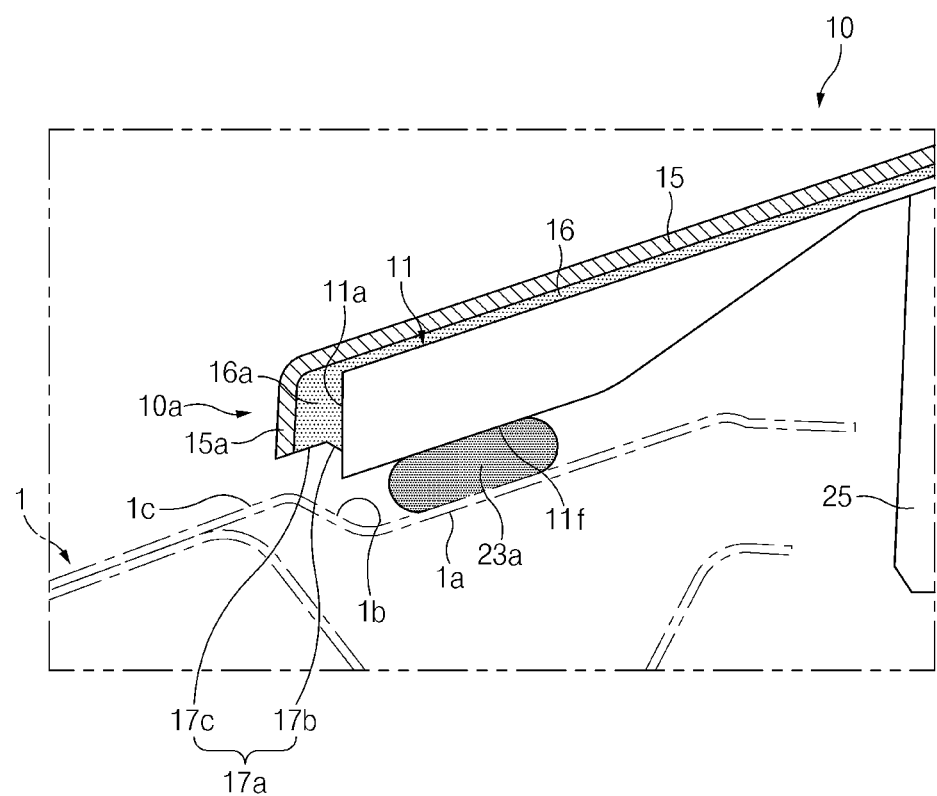
FIG. 5 illustrates a cross-sectional view, taken along line C-C of FIG. 2.

Referring to FIG. 5, the front cover portion 15a may be bent from a front end of the face sheet 15 toward the roof panel 11 so that the front cover portion 15a may cover the front end surface 11a of the roof panel 11. The foam layer 16 may include a front extension portion 16a interposed between the front cover portion 15a and the front end surface 11a of the roof panel 11. The front extension portion 16a may extend from a front edge of the foam layer 16 toward the roof panel 11 and the vehicle body. The front-side bottom surface 11f of the roof panel 11 may be fixed to a front roof rail 1 of the vehicle body through a front adhesive layer 23a. The front roof rail 1 may have a support wall is supporting the front portion of the roof panel 11, an inclined wall 1b extending obliquely from the support wall 1a, and a flat wall is extending from the inclined wall 1b. The front extension portion 16a of the foam layer 16 may have a recess 17a spaced apart from the front roof rail 1 by a predetermined distance, and the recess 17a of the front extension portion 16a may correspond to the shape of the adjacent front roof rail 1. According to an exemplary embodiment, the recess 17a may include an inclined surface 17b parallel to the inclined wall 1b of the front roof rail 1, and a flat surface 17c parallel to the flat wall is of the front roof rail 1.

Figure 6:
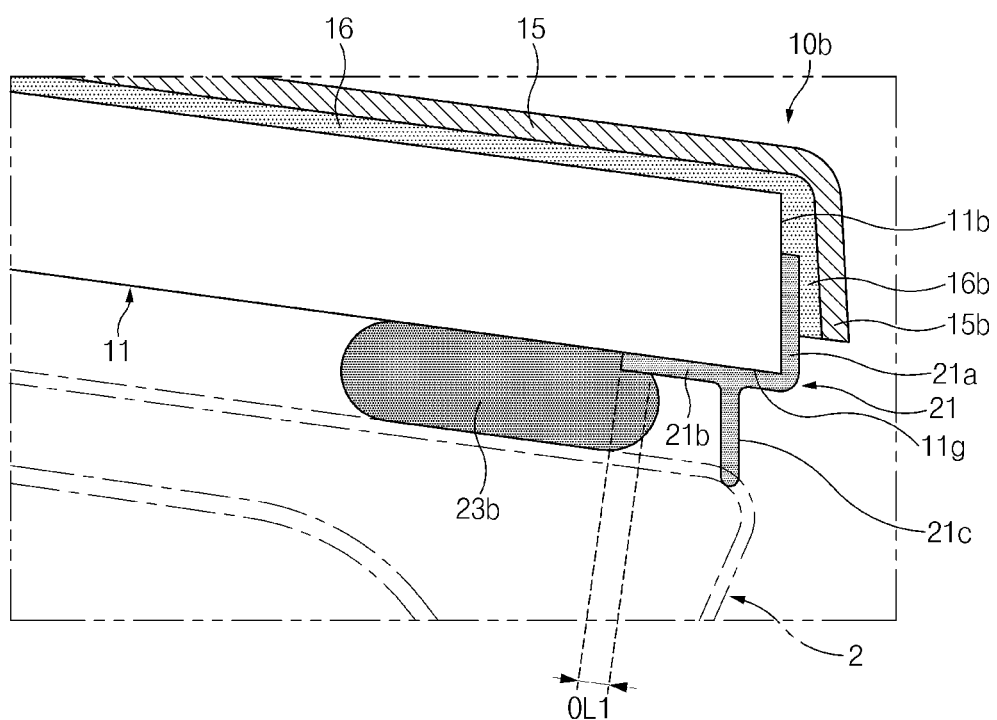
FIG. 6 illustrates a cross-sectional view, taken along line D-D of FIG. 2.

Referring to FIG. 6, the rear cover portion 15b may be bent from a rear end of the face sheet 15 toward the roof panel 11 so that the rear cover portion 15b may cover the rear end surface 11b of the roof panel 11. The foam layer 16 may include a rear extension portion 16b interposed between the rear cover portion 15b of the face sheet 15 and the rear end surface 11b of the roof panel 11. The rear extension portion 16b may extend from a rear edge of the foam layer 16 toward the roof panel 11 and the vehicle body. The rear-side bottom surface 11g of the roof panel 11 may be fixed to a rear roof rail 2 of the vehicle body through the rear adhesive layer 23b.

Referring to FIG. 6, the rear seal strip 21 may be attached to the rear edge of the roof panel 11, and the rear seal strip 21 may provide sealing between the roof panel 11 and the rear roof rail 2 of the vehicle body, thereby ensuring watertightness and preventing dust. The rear seal strip 21 may include a first attachment portion Zia attached to the rear end surface 11b of the roof panel 11, a second attachment portion 21b attached to the rear-side bottom surface ng of the roof panel 11, and a seal lip 21c contacting the vehicle body. The first attachment portion Zia and the second attachment portion 21b may have an L-shaped cross section so that the first attachment portion 21a and the second attachment portion 21b of the rear seal strip 21 may be firmly attached to the rear edge of the roof panel 11. An angle between the first attachment portion 21a and the second attachment portion 21b may be the same as an angle between the rear end surface 11b and the rear-side bottom surface ng of the roof panel 11. The seal lip 21c may extend from the first attachment portion Zia and/or the second attachment portion 21b toward the rear roof rail 2 of the vehicle body, and a free end portion of the seal lip 21c may contact the rear roof rail 2 of the vehicle body. The first attachment portion Zia and the second attachment portion 21b of the rear seal strip 21 may be attached to the rear end surface 11b and the rear-side bottom surface 11g of the roof panel 11 using an adhesive and/or the like. The first attachment portion 21a and the second attachment portion 21b may be attached to the rear edge of the roof panel 11 in two directions so that the rear seal strip 21 may be firmly fixed to the roof panel 11.

As the rear seal strip 21 is made of a rubber material, and the roof panel 11 is made of thermoplastic composites, joining between the rear seal strip 21 and the roof panel 11 may be dissimilar joining of different materials, and accordingly a joining force between the rear seal strip 21 and the roof panel 11 may be relatively reduced. Referring to FIG. 6, when the foamable material is applied and cured between the roof panel 11 and the face sheet 15, the first attachment portion 21a of the rear seal strip 21 may be at least partially embedded into the rear extension portion 16b, of the foam layer 16. Accordingly, the first attachment portion 21a of the rear seal strip 21 may be firmly fixed between the rear end surface 11b of the roof panel 11 and the rear extension portion 10 of the foam layer 16, and thus the rear seal strip 21 may be firmly fixed to the roof panel 11 and the foam layer 16.

Referring to FIG. 6, when the rear-side bottom surface ng of the roof panel 11 is fixed to the rear roof rail 2 of the vehicle body through the rear adhesive layer 23b, the second attachment portion 21b of the rear seal strip 21 may at least partially overlap the rear adhesive layer 23b in a predetermined overlap section OL1. Accordingly, the second attachment portion 21b of the rear seal strip 21 may be firmly fixed between the rear-side bottom surface ng of the roof panel 11 and the rear adhesive layer 23b, and thus the rear seal strip 21 may be firmly fixed to the roof panel 11 and the rear roof rail 2 of the vehicle body.

Figure 7:
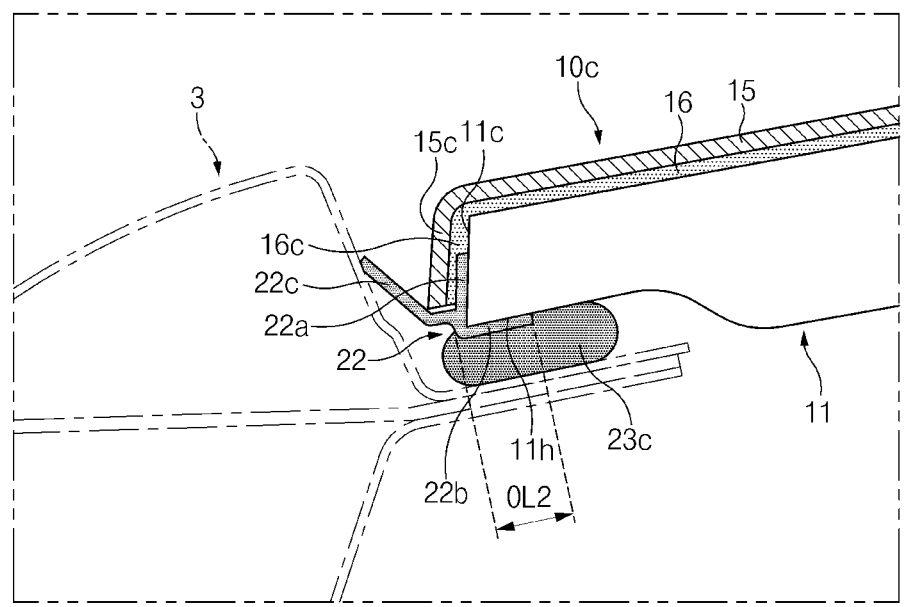
FIG. 7 illustrates a cross-sectional view, taken along line E-E of FIG. 2.

Referring to FIG. 7, each lateral cover portion 15c may be bent from a corresponding lateral edge of the face sheet 15 toward the roof panel 11 so that the lateral cover portion 15c may cover the corresponding lateral end surface 11c of the roof panel 11. The foam layer 16 may include a pair of lateral extension portions 16c corresponding to the pair of lateral cover portions 15c of the face sheet 15, respectively.

Each lateral extension portion 16c may be interposed between the corresponding lateral cover portion 15c of the face sheet 15 and the corresponding lateral end surface 11c of the roof panel 11. Each lateral extension portion 16c may extend from a corresponding lateral edge of the foam layer 16 toward the roof panel 11 and the vehicle body. The lateral-side bottom surface 11h of the roof panel 11 may be fixed to a side panel 3 of the vehicle body through the lateral adhesive layer 23c.

Referring to FIG. 7, each lateral seal strip 22 may be attached to the corresponding lateral edge of the roof panel 11, and the lateral seal strip 22 may provide sealing between the corresponding lateral-side bottom surface 11h of the roof panel 11 and the side panel 3 of the vehicle body, thereby ensuring watertightness and preventing dust. Each lateral seal strip 22 may include a first attachment portion 22a attached to the lateral end surface 11c of the roof panel 11, a second attachment portion 22b attached to the lateral-side bottom surface 11h of the roof panel 11, and a seal lip 22c contacting the side panel 3 of the vehicle body. The first attachment portion 22a and the second attachment portion 22b may have an L-shaped cross section so that the first attachment portion 22a and the second attachment portion 22b of the lateral seal strip 22 may be firmly attached to the corresponding lateral edge of the roof panel 11. An angle between the first attachment portion 22a and the second attachment portion 22b may be the same as an angle between the lateral end surface 11c and the lateral-side bottom surface 11h of the roof panel 11. The seal lip 22C may extend from the first attachment portion 22a and/or the second attachment portion 22b toward the side panel 3 of the vehicle body, and a free end portion of the seal lip 22C may contact the side panel 3 of the vehicle body. The first attachment portion 22a and the second attachment portion 22b of the lateral seal strip 22 may be attached to the lateral end surface 11c and the lateral-side bottom surface 11h of the roof panel 11 using an adhesive and/or the like. The first attachment portion 22a and the second attachment portion 22b may be attached to the lateral edge of the roof panel 11 in two directions so that the lateral seal strip 22 may be firmly fixed to the roof panel 11.

As the lateral seal strip 22 is made of a rubber material, and the roof panel 11 is made of thermoplastic composites, joining between the lateral seal strip 22 and the roof panel 11 may be dissimilar joining of different materials, and accordingly a joining force between the lateral seal strip 22 and the roof panel 11 may be relatively reduced. Referring to FIG. 7, when the foamable material is applied and cured between the roof panel 11 and the face sheet 15, the first attachment portion 22a of the lateral seal strip 22 may be at least partially embedded into the lateral extension portion 16c of the foam layer 16. Accordingly, the first attachment portion 22a of the lateral seal strip 22 may be firmly fixed between the lateral end surface 11c of the roof panel 11 and the lateral extension portion 16c of the foam layer 16, and thus the lateral seal strip 22 may be firmly fixed to the roof panel 11 and the foam layer 16.

Referring to FIG. 7, when the lateral-side bottom surface 11h of the roof panel 11 is fixed to the side panel 3 of the vehicle body through the lateral adhesive layer 23c, the second attachment portion 22b of the lateral seal strip 22 may at least partially overlap the lateral adhesive layer 23c in a predetermined overlap section OL2. Accordingly, the second attachment portion 22b of the lateral seal strip 22 may be firmly fixed between the lateral-side bottom surface 11h of the roof panel 11 and the lateral adhesive layer 23c, and thus the lateral seal strip 22 may be firmly fixed to the roof panel 11 and the side panel 3 of the vehicle body.

The vehicle roof assembly 10 according to an exemplary embodiment of the present disclosure may further include a mounting hardware 30 used for mounting the roof panel 11 on the vehicle body. The mounting hardware 30 may be fixed to the front portion of the roof panel 11, and the mounting hardware 30 may be mounted at a mounting point of the vehicle body so that a fastening force of the mounting hardware 30 may be increased. The vehicle roof assembly 10 may be firmly joined to the vehicle body through the mounting hardware 30, a sealer, and/or the like.

Figure 8:
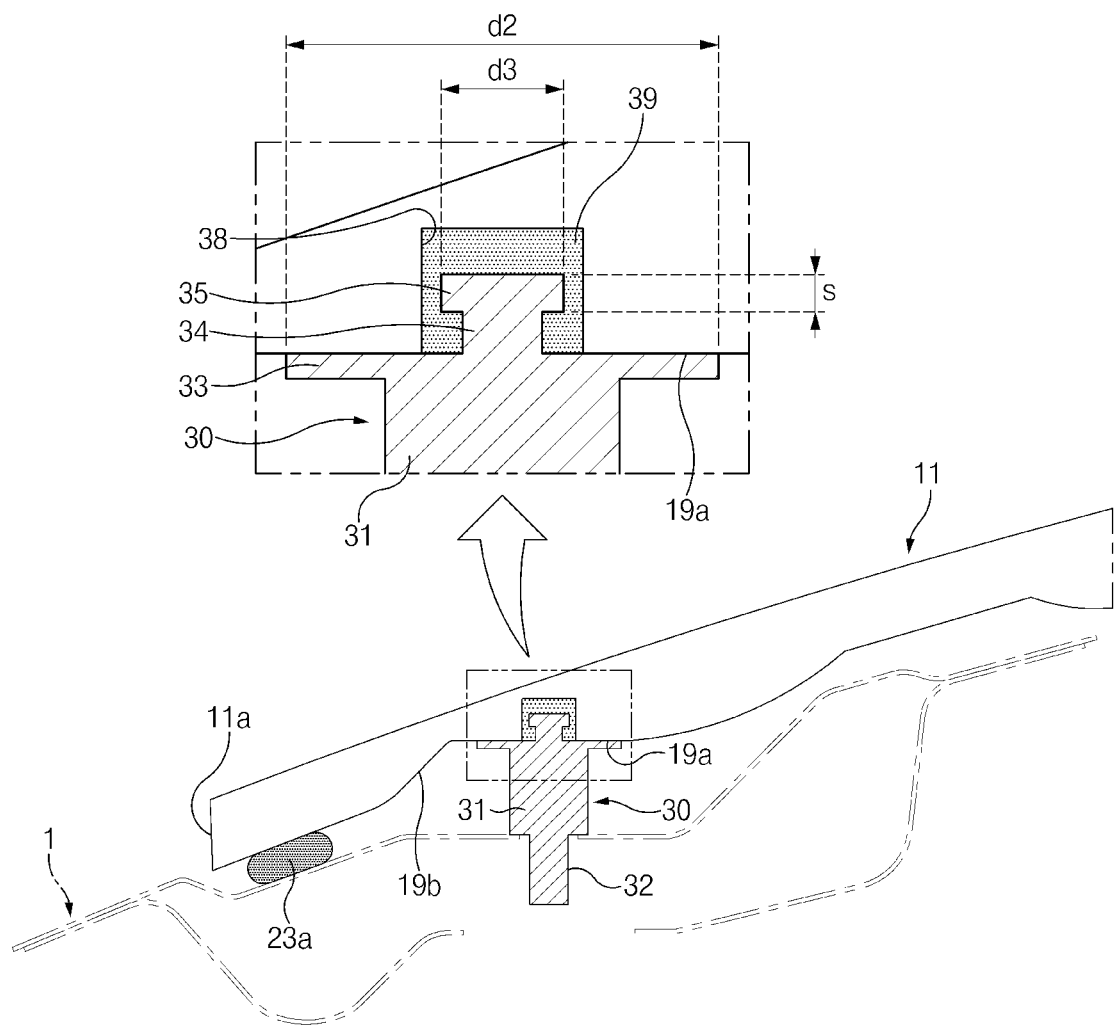
FIG. 8 illustrates a state in which a mounting hardware is fixed to a front portion of a roof panel in a vehicle roof assembly according to an exemplary embodiment of the present disclosure.

Referring to FIG. 8, an upper portion of the mounting hardware 30 may be fixed to a portion of the roof panel 11 adjacent to the front end surface 11a of the roof panel 11, and the mounting hardware 30 may be fitted into a mounting hole of the front roof rail 1 so that the mounting hardware 30 may allow the front portion of the roof panel 11 to be mounted on the front roof rail 1. The roof panel 11 may have a mounting surface 19a to which the mounting hardware 30 is fixed, and a draft surface 19b which is inclined with respect to the mounting surface 19a at a predetermined angle. The mounting surface 19a may be flat in a position adjacent to the front end surface 11a of the roof panel 11. The roof panel 11 may have a mounting recess 38 recessed from the mounting surface 19a toward the top surface of the roof panel 11, and an adhesive layer 39 may fill the mounting recess 38. The upper portion of the mounting hardware 30 may be joined into the mounting recess 38 through the adhesive layer 39. For example, the adhesive layer 39 may include at least one material selected from the group consisting of cyanoacrylate, epoxy, and acrylate.

Referring to FIG. 8, the mounting hardware 30 may include a stud 31, a mounting projection 32 protruding from a top end of the stud 31 toward the vehicle body, and a mounting flange 33 provided on the top end of the stud 31. A central axis of the mounting projection 32 may be aligned with a central axis of the stud 31, and a diameter of the mounting projection 32 may be less than a diameter of the stud 31 so that a shoulder may be formed between the stud 31 and the mounting projection 32. As the mounting projection 32 is fitted into the mounting hole of the front roof rail 1, the stud 31 may maintain a space between the roof panel 11 and the front roof rail 1. The mounting flange 33 may directly contact the mounting surface 19a of the roof panel 11, and the mounting flange 33 may be fixed to the mounting surface 19a of the roof panel 11 using an adhesive. According to an exemplary embodiment, the mounting flange 33 may have a circular shape having a predetermined diameter d2, and the diameter of the mounting flange 33 may be greater than the diameter of the stud 31. The diameter d2 of the mounting flange 33 may be 10-50 mm. According to another exemplary embodiment, the mounting flange 33 may have a rectangular shape.

Referring to FIG. 8, the mounting hardware 30 may include a shank 34 extending from the stud 31 toward the roof panel 11, and a head 35 provided on a top end of the shank 34. The shank 34 and the head 35 may be inserted into the mounting recess 38, and the shank 34 and the head 35 may be fixed to the mounting recess 38 through the adhesive layer 39. The head 35 may have a predetermined diameter d3, and the diameter d3 of the head 35 may be less than the diameter of the mounting recess 38 and the diameter d2 of the mounting flange 33. The head 35 may be inserted into the mounting recess 38 by a predetermined depth s. For example, the diameter d3 of the head 35 may be 3-20 mm, and the depth s of the head 35 inserted into the mounting recess 38 may be 3-10 mm.

According to the exemplary embodiment illustrated in FIG. 8, the fastening force of the mounting hardware 30 may be relatively increased as the shank 34 and the head 35 are fixed to the mounting recess 38 through the adhesive layer 39, and the mounting flange 33 is fixed to the mounting surface 19a. For example, a fixing force of the mounting hardware 30 according to the exemplary embodiment illustrated in FIG. 8 measured through a pull-out test may be 1000 N. Here, the fixing force in the pull-out test refers to a maximum external force N that holds the mounting hardware 30 fixed to the roof panel 11 before the mounting hardware 30 is broken.

The diameter d2 of the mounting flange 33, the diameter d3 of the head 35, the depth s of the head 35, and the like may be important factors affecting the pull-out test performance.

Figure 9:
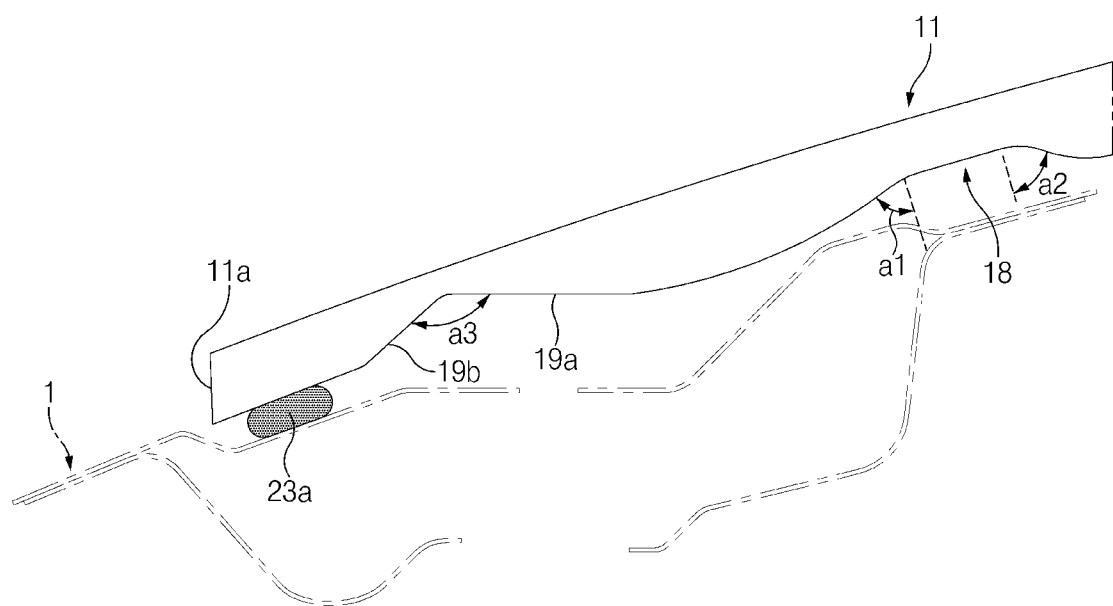
FIG. 9 illustrates a forming portion, a mounting surface, and a draft surface of a roof panel in a vehicle roof assembly according to an exemplary embodiment of the present disclosure.

Referring to FIG. 9, at least one forming portion 18 may be formed on the bottom surface of the roof panel 11 through thermoforming, and the forming portion 18 may be provided in various manners by considering stiffness of the roof panel 11, interference between the roof panel 11 and other components, and the like. For example, the forming portion 18 may be a recess, a projection, or the like. As illustrated in FIG. 9, the forming portion 18 may be a recess, and each inclined surface of the forming portion 18 may have various draft angles a1 and a2. Each of the draft angles a1 and a2 of the forming portion 18 may be determined based on molding accuracy and releasability of the roof panel 11. Preferably, each of the draft angles a1 and a2 may be 3-10°. When each of the draft angles a1 and a2 is less than a minimum value (for example, 3°), the roof panel 11 may not be easily released from a mold, or the roof panel 11 may be damaged while being released. When each of the draft angles a1 and a2 exceeds a maximum value (for example, 10°), the shape of the forming portion 18 of the roof panel 11 may not correspond to a desired design shape.

Referring to FIG. 9, an angle between the mounting surface 19a and the draft surface 19b of the roof panel 11 may be a predetermined draft angle, and the draft angle may be determined based on molding accuracy and releasability of the roof panel 11. Preferably, an angle a3 between the mounting surface 19a and the draft surface 19b may be 100-160°. When the angle a3 between the mounting surface 19a and the draft surface 19b is less than a minimum value (for example, 100°), the roof panel 11 may not be easily released from the mold, or the roof panel 11 may be damaged while being released. When the angle a3 between the mounting surface 19a and the draft surface 19b exceeds a maximum value (for example, 160°), the shape of the mounting surface 19a and the draft surface 19b of the roof panel 11 may not correspond to a desired design shape.

A method for manufacturing a vehicle roof assembly according to an exemplary embodiment of the present disclosure may include the following processes: forming a roof panel; forming a face sheet; and fixing the face sheet to the roof panel through a foam layer.

The upper skin 13 and the lower skin 14 may be fixed to the top and bottom surfaces of the core 12 through heat fusion, respectively, to thereby form the roof panel 11 into an initial shape. Thereafter, the roof panel 11 may be formed into a final shape corresponding to a desired design shape through thermoforming.

The thermoforming process will be described in detail below.

The roof panel 11 of the initial shape may be heated in an infrared (IR) oven 60 so that the roof panel 11 may be entirely softened. Thereafter, the heated roof panel 11 may be pressed in a mold to thereby be molded into a final shape corresponding to a desired design shape.

Figure 10:
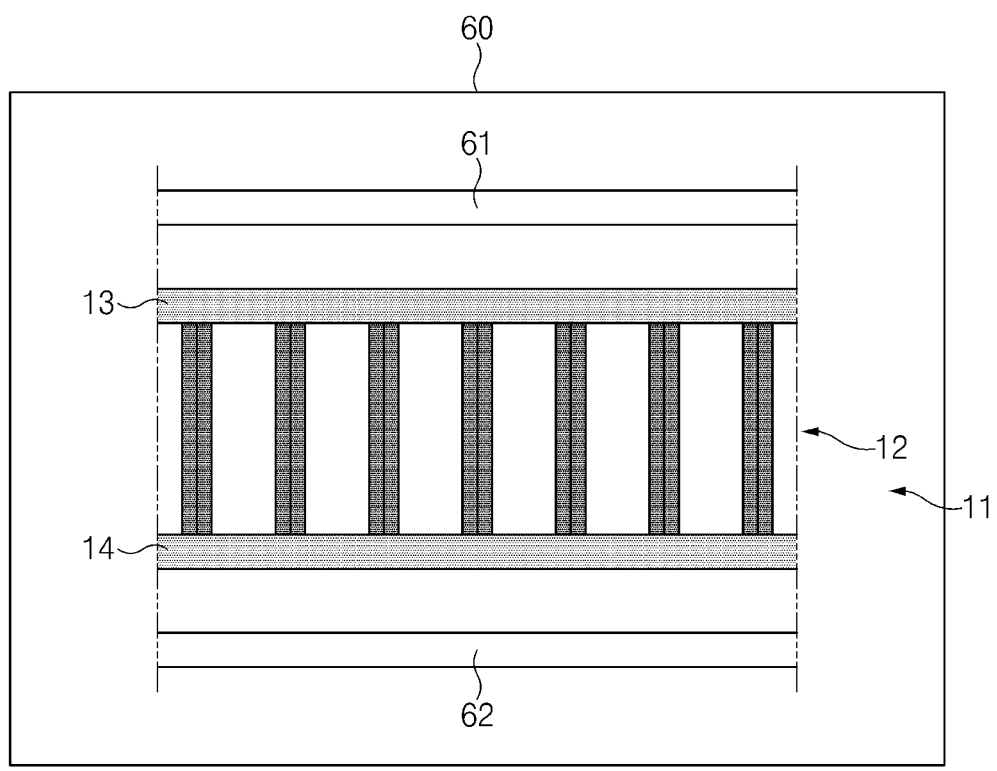
FIG. 10 illustrates a state in which a roof panel is located in an oven in a vehicle roof assembly according to an exemplary embodiment of the present disclosure.

Referring to FIG. 10, the IR oven 60 may include an upper heater 61 and a lower heater 62 disposed in an internal space thereof. After the roof panel 11 of the initial shape is received in the IR oven 60, the upper heater 61 may be located above the upper skin 13 of the roof panel 11, and the lower heater 62 may be located below the lower skin 14 of the roof panel 11. Accordingly, the upper heater 61 may heat the upper portion of the roof panel 11, and the lower heater 62 may heat the lower portion of the roof panel 11 so that the upper skin 13, the core 12, and the lower skin 14 of the roof panel 11 may be appropriately softened, which is advantageous for molding. The softened roof panel 11 may be pressed in the mold so that the roof panel 11 may be molded into the final shape. After the roof panel 11 is formed into the final shape, the seal strip 20 may be attached to the edge of the roof panel 11 using an adhesive.

When the roof panel 11 is heated by the upper heater 61 and the lower heater 62, formability of the roof panel 11 may differ according to a surface temperature of the roof panel 11. To improve the forming accuracy of the roof panel 11, the roof panel 11 may be heated until it reaches a predetermined temperature range favorable to the formation (molding) of the roof panel 11, and then the roof panel 11 may be pressed in the mold so that the roof panel 11 may be molded into the final shape. In particular, the roof panel 11 may be heated until a surface temperature of a central portion of the roof panel 11 reaches the predetermined temperature range so that the roof panel 11 may be softened, which is advantageous for its molding. That is, the surface temperature of the central portion of the roof panel 11 may be a reference point for heating and softening the roof panel 11. The surface temperature of the central portion of the roof panel 11 may be measured by a temperature sensor. According to an exemplary embodiment, the surface temperature of the central portion of the roof panel 11 may range from 190° C. to 210° C.

Specifically, after the roof panel 11 is heated until the surface temperature of the central portion of any one of the upper skin 13 and the lower skin 14 of the roof panel 11 reaches 190° C.-210° C., the roof panel 11 may be pressed in the mold so that the roof panel 11 may be molded into the final shape.

Figure 11:
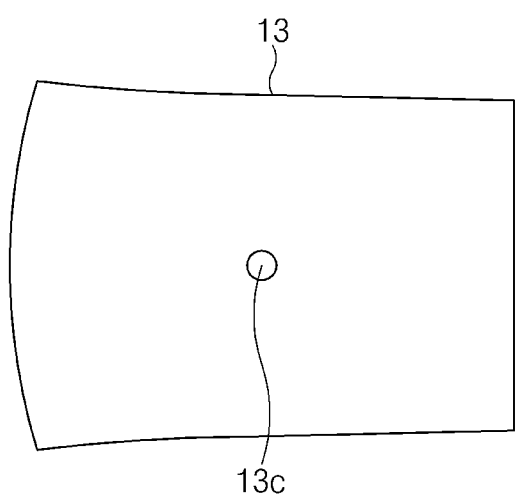
FIG. 11 illustrates a plan view of an upper skin of a roof panel in a vehicle roof assembly according to an exemplary embodiment of the present disclosure.

Referring to FIG. 11, considering that the temperature sensor is easy to use to measure a surface temperature of a central portion 13c of the upper skin 13, after the roof panel 11 is heated until the surface temperature of the central portion 13c of the upper skin 13 reaches 190° C.-210° C., the roof panel 11 may be pressed in the mold so that the roof panel 11 may be molded into a final shape corresponding to a desired design shape.

When the surface temperature of the central portion 13c of the upper skin 13 is 170° C., the melting of the upper skin 13 and/or the lower skin 14 may be partially insufficient and the softening of the core 12 may be partially insufficient, and thus the final shape of the roof panel 11 may fail to correspond to the desired design shape. When the surface temperature of the central portion 13c of the upper skin 13 is 190° C., the melting of the upper skin 13 may be sufficient, but the melting of the lower skin 14 may be partially insufficient and the softening of the core 12 may be satisfactory, and thus the roof panel 11 may be formed into the final shape corresponding to the desired design shape. When the surface temperature of the central portion 13c of the upper skin 13 is 210° C., the melting of the upper skin 13 may be partially excessive, but the melting of the lower skin 14 may be satisfactory and the softening of the core 12 may be satisfactory, and thus the roof panel 11 may be formed into the final shape corresponding to the desired design shape. When the surface temperature of the central portion 13c of the upper skin 13 is 230° C., the upper skin 13, the lower skin 14, and the core 12 may be excessively melted, and thus the upper portion and the lower portion of the roof panel 11 may be partially deformed. When the surface temperature of the central portion 13c of the upper skin 13 is 250° C., the upper skin 13, the lower skin 14, and the core 12 may be very excessively melted, and thus the entirety of the roof panel 11 may be excessively deformed.

Figure 12:
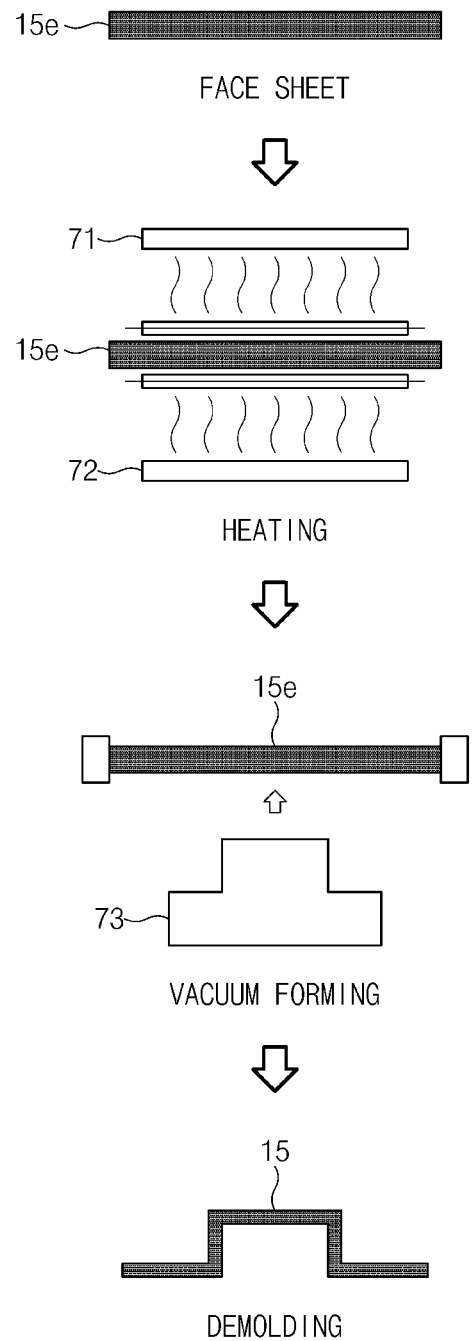
FIG. 12 illustrates a process of forming a face sheet in a method for manufacturing a vehicle roof assembly according to an exemplary embodiment of the present disclosure.

Referring to FIG. 12, a sheet material 15e having a predetermined thickness (for example, 2 mm) may be prepared, and the sheet material 15e may be made of thermoplastic resin such as ABS resin and PMMA.

The sheet material 15e may be heated by an upper heater 71 and a lower heater 72. In a state in which the heated sheet material 15e is located on a mold 73, a vacuum may be applied to the mold 73 so that the sheet material 15e may be formed as the face sheet 15 through vacuum forming. Thereafter, the face sheet 15 may be released from the mold 73 (demolding), and the edges of the face sheet 15 may be formed into a final shape through a finishing process.

Figure 13:
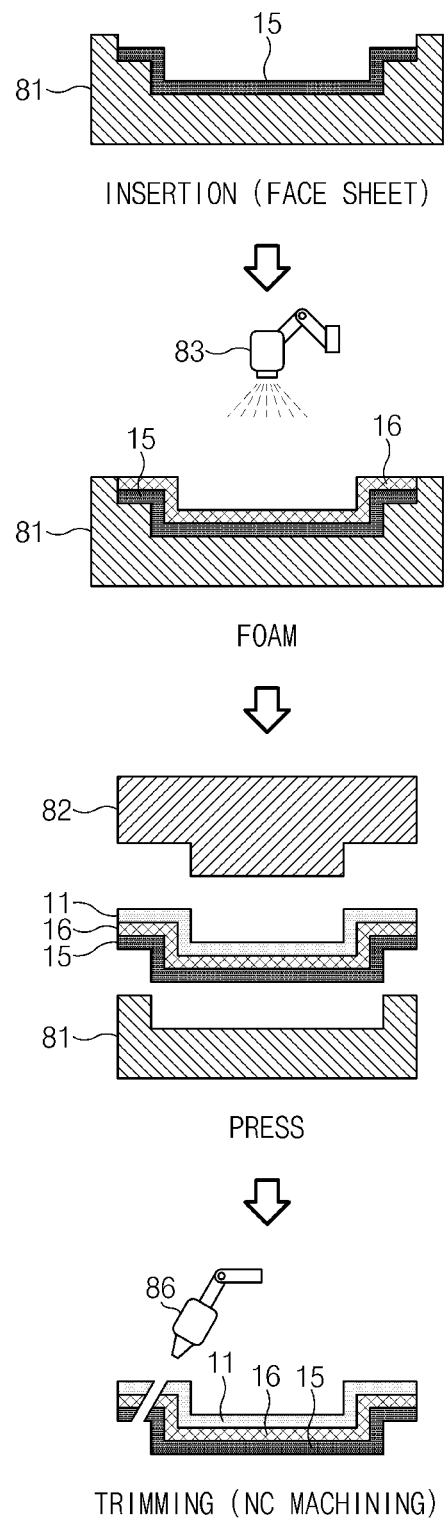
FIG. 13 illustrates a process of fixing a face sheet to a roof panel through formation of a foam layer in a method for manufacturing a vehicle roof assembly according to an exemplary embodiment of the present disclosure.

Referring to FIG. 13, the face sheet 15 may be inserted into a cavity of a lower mold 81, and a foamable material may be applied to the face sheet 15 by an applicator 83. The applied foamable material may be foamed to form the foam layer 16. After the roof panel 11 is located on the foam layer 16, the roof panel 11, the foam layer 16, and the face sheet 15 may be pressed between an upper mold 82 and the lower mold 81, and the foam layer 16 may be cured so that the roof panel 11 and the face sheet 15 may be fixed to the foam layer 16. Accordingly, the roof panel 11, the foam layer 16, and the face sheet 15 may be stacked. Then, the edges of the roof panel 11, the foam layer 16, and the face sheet 15 which are stacked may be subjected to a finishing process such as trimming by an NC machine 86 so that a vehicle roof assembly may be completely manufactured.

Figure 14:
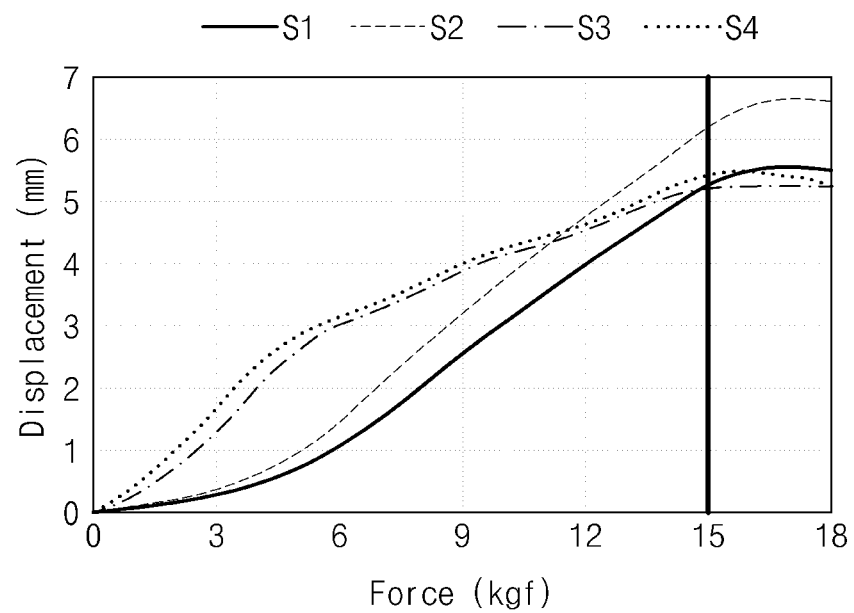
FIG. 14 illustrates a graph of analysis results of stiffness of a vehicle roof assembly made of a steel material according to the related art.

FIG. 14 illustrates a graph of analysis results of stiffness of a vehicle roof assembly made of a steel material according to the related art. The results may be obtained by measuring the amount of displacement with respect to a vertical load applied to each of four points S1, S2, S3, and S4 selected among stiffness weak points of the related art vehicle roof assembly. Referring to FIG. 14, when the vertical load is 15 kgf, the amount of displacement at the four points S1, S2, S3, and S4 of the related art vehicle roof assembly may be 5 mm or greater.

Figure 15:
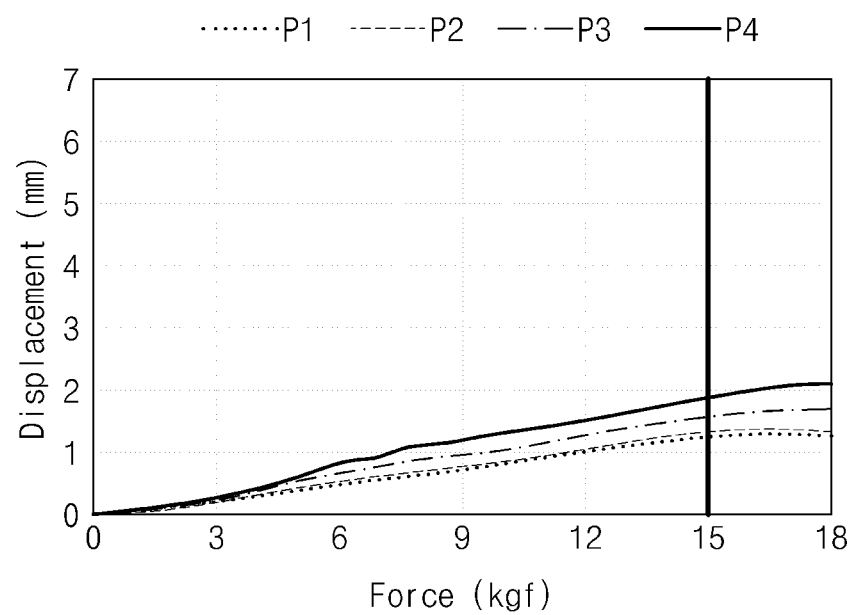
FIG. 15 illustrates a graph of analysis results of stiffness of a vehicle roof assembly according to an exemplary embodiment of the present disclosure.

FIG. 15 illustrates a graph of the analysis results of stiffness of a vehicle roof assembly according to an exemplary embodiment of the present disclosure. The results may be obtained by measuring the amount of displacement with respect to a vertical load applied to each of four points P1, P2, P3, and P4 selected among stiffness weak points of the vehicle roof assembly according to an exemplary embodiment of the present disclosure. Referring to FIG. 15, when the vertical load is 15 kgf, the amount of displacement at the four points P1, P2, P3, and P4 of the vehicle roof assembly according to an exemplary embodiment of the present disclosure may be 2 mm or less.

As a result, the stiffness of the vehicle roof assembly according to an exemplary embodiment of the present disclosure may be improved compared to the stiffness of the related art vehicle roof assembly.

According to exemplary embodiments of the present disclosure, the roof panel 11 may be a sandwich panel including thermoplastic composites, and the core 12 may have a honeycomb structure so that the roof panel 11 may achieve a significant weight reduction compared to the related art roof panel made of a steel material. For example, while the weight of the related art roof panel made of the steel material is 14.66 kg, the weight of the roof panel 11 according to an exemplary embodiment of the present disclosure may be reduced by approximately 25%. In particular, the stiffness of the roof panel 11 may be improved compared to the stiffness of the related art roof panel.

According to exemplary embodiments of the present disclosure, as the upper skin 13 and the lower skin 14 are attached to the core 12 having the honeycomb structure, the upper skin 13 and the lower skin 14 may inevitably have the sink mark due to the telegraphing effect. As the face sheet 15 is fixed to the upper skin 13 of the roof panel 11 through the foam layer 16, it may prevent the sink mark of the upper skin 13 from being exposed, and thus the exterior quality of the vehicle roof assembly 10 may be significantly improved.

According to exemplary embodiments of the present disclosure, as the mounting hardware 30 is mounted on the roof panel 11, the vehicle roof assembly 10 may be firmly mounted on the vehicle body.

As set forth above, according to exemplary embodiments of the present disclosure, as the roof panel is made of thermoplastic composites, the weight of the roof panel itself may be significantly reduced, and the stiffness, strength, and impact resistance of the roof panel may be improved.

According to exemplary embodiments of the present disclosure, the face sheet may be fixed to the upper portion of the roof panel through the foam layer made of a foamable material, and thus the exterior quality of the vehicle roof assembly may be improved.

According to exemplary embodiments of the present disclosure, as the roof panel is formed of the sandwich panel including thermoplastic composites, it may have high section modulus, thereby having very excellent strength and stiffness relative to its weight. Accordingly, even if a reinforcing member is not used, the impact resistance, strength, and stiffness of the roof panel may be sufficiently secured, and the weight reduction of the roof panel may be effectively achieved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A roof assembly for a vehicle, the roof assembly comprising:
   a roof panel comprising a core, an upper skin attached to a top surface of the core, and a lower skin attached to a bottom surface of the core;
   a face sheet disposed above the roof panel; and
   a foam layer interposed between the roof panel and the face sheet,
   wherein:
   the face sheet comprises a cover portion covering an end surface of the roof panel, and the foam layer comprises an extension portion interposed between the cover portion and the end surface of the roof panel.

2. The roof assembly according to claim 1, wherein the face sheet covers end surfaces of edges of the roof panel and a top surface of the roof panel.

3. The roof assembly according to claim 1, wherein the extension portion of the foam layer has a recess spaced apart from a vehicle body by a predetermined distance.

4. The roof assembly according to claim 1, further comprising a seal strip mounted on an edge of the roof panel, wherein the seal strip comprises a first attachment portion attached to the end surface of the roof panel, a second attachment portion attached to a bottom surface of the roof panel, and a seal lip configured to contact a vehicle body, and wherein the edge of the roof panel is configured to be fixed to the vehicle body through an adhesive layer.

5. The roof assembly according to claim 4, wherein:
the first attachment portion is partially embedded into the extension portion; and
the second attachment portion partially overlaps the adhesive layer.

6. The roof assembly according to claim 1, further comprising mounting hardware fixed to the roof panel, wherein the roof panel comprises a mounting surface to which the mounting hardware is fixed.

7. The roof assembly according to claim 6, wherein:
the roof panel has a mounting recess recessed from the mounting surface toward a top surface of the roof panel;
the mounting hardware comprises a stud, a shank extending from the stud toward the roof panel, and a head provided on a top end of the shank; and
the head and the shank are inserted into the mounting recess and are fixed to the mounting recess through an adhesive layer.

8. The roof assembly according to claim 7, wherein:
the mounting hardware further comprises a mounting flange provided on a top end of the stud; and
the mounting flange is fixed to the mounting surface of the roof panel through an adhesive.

9. The roof assembly according to claim 7, wherein the roof panel further comprises a draft surface inclined with respect to the mounting surface at a predetermined angle.

10. The roof assembly according to claim 1, wherein the core comprises thermoplastic, and wherein each of the upper skin and the lower skin comprises a reinforcing fiber and a thermoplastic resin.

11. A method for manufacturing a roof assembly for a vehicle, the method comprising:
forming a roof panel by fixing an upper skin to a top surface of a core and fixing a lower skin to a bottom surface of the core;
forming a face sheet through vacuum forming; and
fixing the roof panel to the face sheet through formation of a foam layer,
wherein:
the face sheet comprises a cover portion covering an end surface of the roof panel, and
the foam layer comprises an extension portion interposed between the cover portion and the end surface of the roof panel.

12. The method according to claim 11, wherein forming the roof panel comprises:
fixing the upper skin and the lower skin to the top surface and the bottom surface of the core, respectively, through heat fusion;
heating the roof panel to soften the roof panel; and
pressing the roof panel to form the roof panel into a final shape.

13. The method according to claim 12, further comprising attaching a seal strip to an edge of the roof panel.

14. The method according to claim 11, wherein fixing the roof panel to the face sheet comprises:
inserting the face sheet into a cavity of a mold;
forming the foam layer by applying a foamable material to the face sheet by an applicator; and
pressing the roof panel, the foam layer, and the face sheet after the roof panel is located on the foam layer.

15. A vehicle comprising:
a vehicle body comprising a plurality of roof rails and a side panel;
a roof panel comprising a core, an upper skin attached to a top surface of the core, and a lower skin attached to a bottom surface of the core, wherein a front-side bottom surface of the roof panel is fixed to a front roof rail of the plurality of roof rails;
a face sheet disposed above the roof panel; and
a foam layer interposed between the roof panel and the face sheet,
wherein:
the face sheet comprises a cover portion covering an end surface of the roof panel, and
the foam layer comprises an extension portion interposed between the cover portion and the end surface of the roof panel.

16. The vehicle according to claim 15, further comprising a seal strip mounted on an edge of the roof panel, wherein the seal strip comprises a first attachment portion attached to the end surface of the roof panel, a second attachment portion attached to a bottom surface of the roof panel, and a seal lip contacting the vehicle body, and wherein the edge of the roof panel is fixed to the vehicle body through an adhesive layer.

17. The vehicle according to claim 15, further comprising mounting hardware mounted at a mounting point of the vehicle body and fixed to the roof panel.

18. The vehicle according to claim 15, wherein the core comprises thermoplastic, and wherein each of the upper skin and the lower skin comprises a reinforcing fiber and a thermoplastic resin.

* * * * *